(12) United States Patent
Van Rooij

(10) Patent No.: US 8,029,398 B2
(45) Date of Patent: Oct. 4, 2011

(54) TRANSMISSION CHAIN

(75) Inventor: Jacobus Hubertus Maria Van Rooij, Nuenen (NL)

(73) Assignee: Gear Chain Industrial B.V., Nuenen (NL)

( * ) Notice: Subject to any disclaimer, the term of this patent is extended or adjusted under 35 U.S.C. 154(b) by 493 days.

(21) Appl. No.: 12/230,869

(22) Filed: Sep. 5, 2008

(65) Prior Publication Data

US 2009/0069137 A1 Mar. 12, 2009

(30) Foreign Application Priority Data

Sep. 7, 2007 (BE) .................................. 2007/0438

(51) Int. Cl.
*F16G 13/02* (2006.01)
(52) U.S. Cl. ...................................................... 474/229
(58) Field of Classification Search .................. 474/201, 474/202, 204, 206, 212, 214, 215, 229, 230, 474/238, 242
See application file for complete search history.

(56) References Cited

U.S. PATENT DOCUMENTS

| 5,728,021 A | 3/1998 | Van Rooij et al. |
| 2007/0093332 A1 | 4/2007 | Vornehm et al. |

FOREIGN PATENT DOCUMENTS

| EP | 1788280 A2 | 5/2000 |
| EP | 0741255 B2 | 5/2007 |

*Primary Examiner* — William E Dondero
(74) *Attorney, Agent, or Firm* — Duane Morris LLP

(57) ABSTRACT

Transmission chain with links coupled by rocker assemblies with each two longitudinal pins which roll over each other and of which one cooperates in a force transmitting way with the opposite pulleys of a pair of cone-shaped pulley sheaves, and these pins have a first dimension (b) in the longitudinal direction, a second dimension (h) perpendicular to the longitudinal direction and to the running direction of the chain and a third dimension (d) cross-wise to the longitudinal direction and in the running direction, in which for each value of the first dimension (b) both other dimensions (h) and (d), respectively, are such that the ratio between this dimension (b) and each of the other dimensions, is, taking into account the expected loading of the chain, as small as possible.

1 Claim, 4 Drawing Sheets

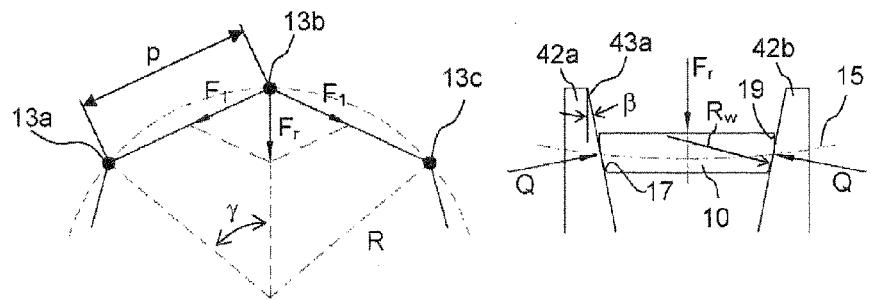
Fig. 1c
Prior Art
Fig. 1d
Prior Art
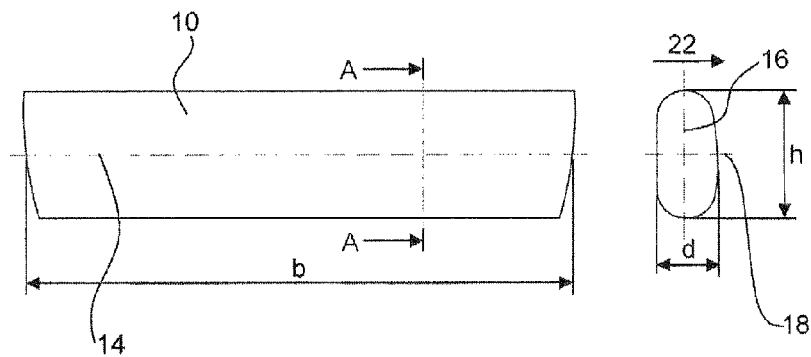
Fig. 2a
Fig. 2b

TRANSMISSION CHAIN

The invention relates to a transmission chain with links mutually coupled by rocker assemblies, which each comprise a first and a second elongated pin, of which the first pin rolls during operation with the curved longitudinal surface thereof over the opposite longitudinal surface of the second pin, while in each rocker assembly the first pin is destined to cooperate in a force transferring way with the opposite cone pulleys of a pair of pulley sheaves, and all pins have a first dimension (b) in the longitudinal direction thereof, a second dimension (h) in a direction perpendicular to the longitudinal direction as well as to the running direction of the chain in which said pin is accommodated and a third dimension (d) cross-wise to the longitudinal direction and lying in the running direction.

Such a chain is known in itself from EP 0 741 255 B2 in the name of applicant and from the U.S. Pat. No. 5,728,021, which corresponds therewith.

In such a transmission chain the first and second pins are stressed as result of the longitudinal forces, which are generated in the chain during operation, while furthermore the first pins, which cooperate in a force transferring way with the surfaces of the pulley sheaves when they are supported by these surfaces on which they bear are loaded by radial forces so that they tend to bend into a radial direction.

The present application is based on the insight that it is desirable to restrict the bending of the pins, and particularly the bending of the first pins as much as possible and aims to provide measures by means of which this can be implemented.

According to the present application this aim is achieved in that for each value of the first dimension (b), as determined by the preferred width of the chain, the two other dimensions (h) and (d) respectively, are chosen such that the ratios between this dimension (b) and each of the two other dimensions, taking into account the expected loading of the chain, has a value which is as small as possible.

Thus, starting from a given measure in the first dimension (b) in the longitudinal direction, and taking into account the expected maximum loading of the chain, the bending which occurs during operation will be minimal.

In one embodiment, the preferred values for the ratio between the first dimension (b) and the second dimension (h) is smaller than approximately 4.1. In another embodiment, the preferred value for the ratio between the first dimension (b) and the third dimension (d) is smaller than approximately 8.2.

In another aspect, the present application describes a method for dimensioning a transmission chain with links, mutually coupled by rocker assemblies, which each comprise a first and a second longitudinal pin of which during operation, the first pin rolls with its curved longitudinal surface over an opposite longitudinal surface of the second pin, while in each rocker assembly one of the pins is destined to cooperated in a force transferring way with an opposite pulley of a pair of pulley sheaves, and the first pin has a dimension (b) in the longitudinal direction thereof, a second dimension (h) in a direction perpendicular to the longitudinal direction and to the running direction of the chain in which said pin is used and a third dimension (d) cross-wise to the longitudinal direction and in the running direction, and when dimensioning the chain the value of the first dimension (b), as determined by the necessary width of the chain, the other dimensions (b) and (h), respectively, are dimensioned in such a way that the ratio between this first dimension (b) and each of the other two dimensions, taking into account the expected loading of the chain has a value, which is as small as possible and to adapt this chain to a higher power, each of said three dimensions is increased with an equal factor.

In another aspect, the present application is thus directed to the ratios between said dimensions and not to the absolute values thereof.

It is observed that EP 1 788 280 seeks to define an optimal relation between the dimensions of the opening in the links, which accommodate the pins in a chain of the kind to which the present application refers and the thickness of these links, however without taking the dimensions of the pins into account and without arriving at the relationships as proposed by the present application. US 2007/0093332 addresses the problem of how to minimize the stresses in the curved parts of the openings and gives rules relating to a preferred relation between the thickness of the links and the height and width, respectively, of the rocker pins. However, the stresses in the pins as a result of the torque transfer and the bending of the pins as a result thereof are not taken into account in US 2007/0093332 and the dimensional ratios of the rocker pins as proposed by the present application are not disclosed or obvious over US 2007/0093332.

BRIEF DESCRIPTION OF THE DRAWINGS

The present application will be elucidated with reference to the drawings.

FIG. 1c is a simplified schematic side view of the radial forces acting on the chain illustrated in FIGS. 1a and 1b during operation, resulting from the tensile forces, which then occur.

FIG. 1d is a simplified schematic longitudinal view of the radial forces acting on the chain illustrated in FIGS. 1a and 1b during operation, resulting from the tensile forces, which then occur;

FIG. 2a is a longitudinal perspective view a pin of a rocking member assembly, which cooperates in a force transferring way with the pulley surfaces in one embodiment of the present application.

FIG. 2b is a side perspective view a pin of a rocking member assembly, which cooperates in a force transferring way with the pulley surfaces in one embodiment of the present application.

DETAILED DESCRIPTION

Figure 1A:
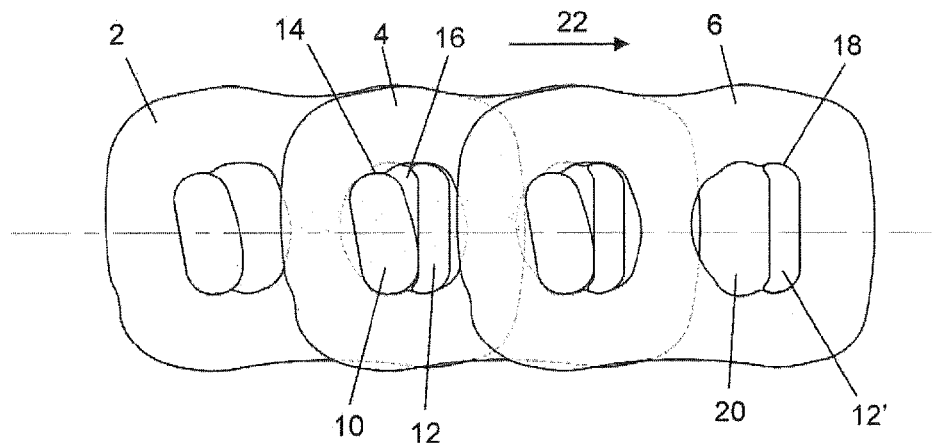
FIG. 1a is a simplified pictorial representation of a side view of the links and the pins of a prior art transmission chain when the chain is stretched
Figure 1B:
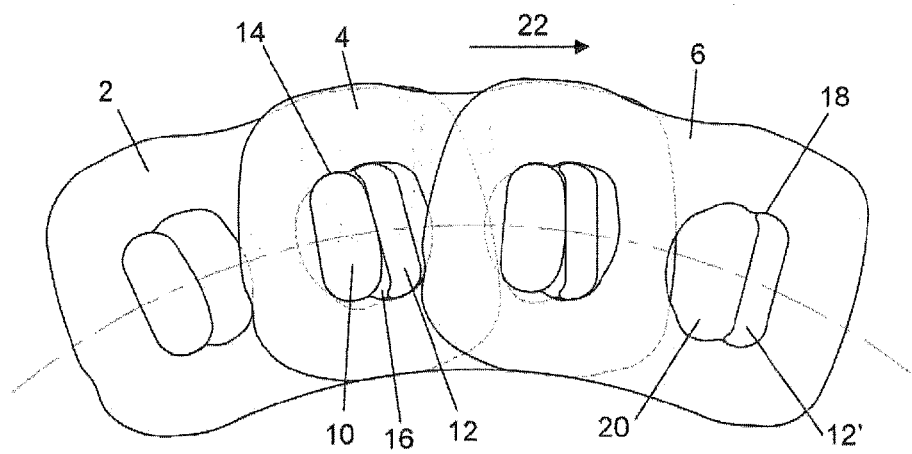
FIG. 1b is a corresponding view of a curved chain of FIG. 1A.
Figure 4:
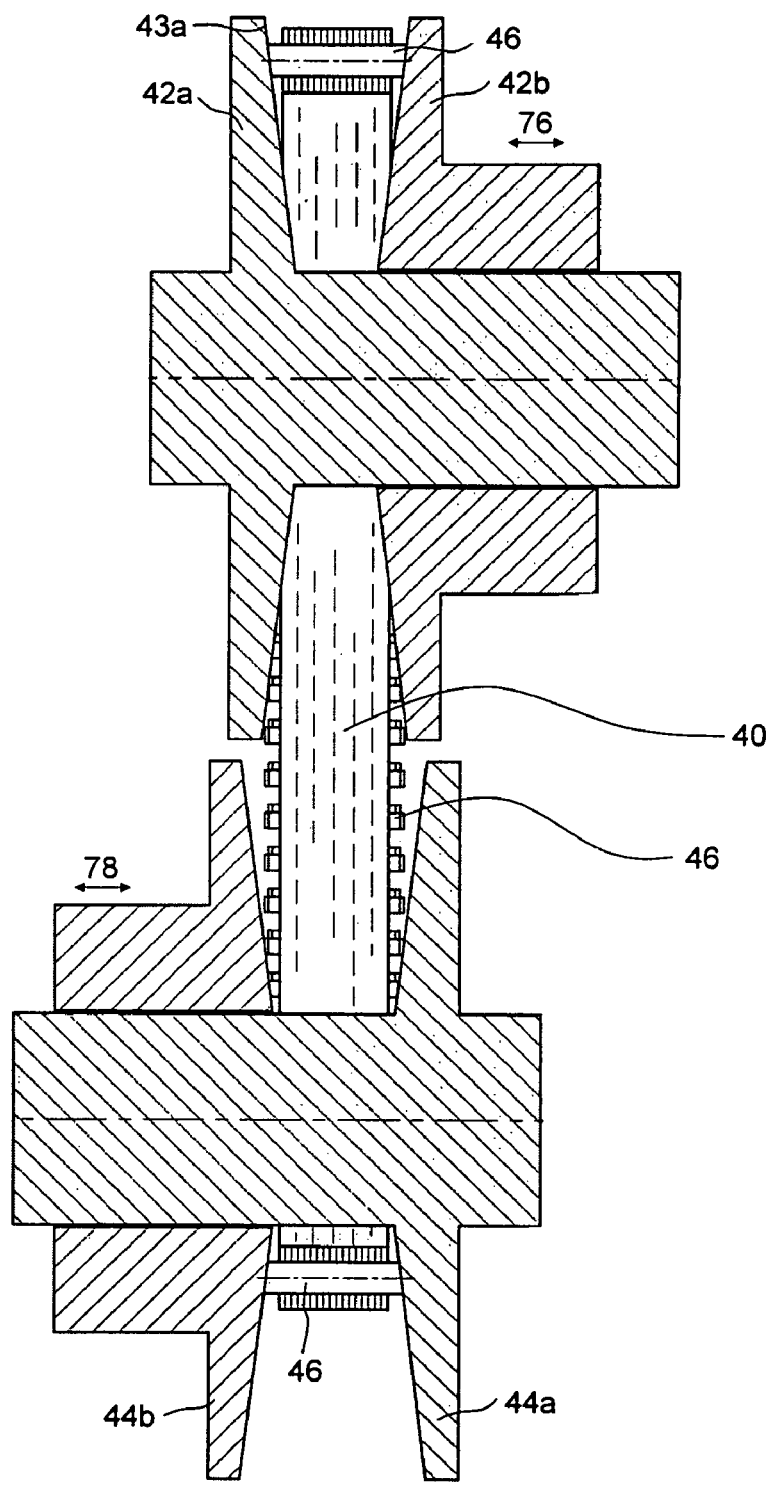
FIG. 4 is a simplified schematic view of how a chain according to one embodiment of the present application cooperates with the pulley sheaves of a continuously variable transmission.

FIGS. 1a and 1b show a part of a transmission chain in the stretched and curved situation, respectively, and more particularly three links thereof, indicated with reference numerals 2, 4 and 6, such as known from EP 0 741 255. The direction of movement of this chain is indicated with the arrow 22; the chain is also shown in FIG. 4 and indicated by reference numeral 40. The links are mutually coupled by rocker assemblies of which in FIGS. 1a and 1b two are completely shown and each assembly comprises a first pin 10 and a thinner, strip-like second pin 12. The pins 10, 12 are destined to cooperate with their respective longitudinal ends with the opposite pulley sheave surfaces of a pair of pulley sheaves, such in the way as described in EP 9 741 255 and shown in FIG. 4. As is also described in these publications, each first pin and each second pin is non-rotatable accommodated in an enclosing opening in a link; in this way a pin 10 is enclosed within the part contour 14 of the opening 16 in the link 4 and the strip-shaped pin 12' is non-rotatable accommodated within the part contour 18 of the opening 20 in link 6.

As described in EP 0 741 255 the free space which is present near each first pin and each second pin corresponds with the envelope of the path which is described by a cooperating combination of first pin and second pin.

FIG. 1c shows schematically and in end view three pin assemblies 13a, 13b and 13c, each schematically indicated with a filled circle and each comprising a first pin 10 and a cooperating thinner strip-shaped pin 12, such as described above. The mutual distance p of these assemblies corresponds with the pitch of the chain over the—not shown—pulleys while the running radius is indicated with R; the tensile force in the chain is indicated with $F_1$. The angle between the running radiuses of two subsequent rocker assemblies is shown with γ.

With reference to FIG. 1d, the angle of the pulley surfaces 43a of the pulley sheave 42a is indicated with β. The other pulley sheaves 42b, 44a and 44b, as indicated in FIG. 4, are provided with conical surfaces with a corresponding angle.

It can be argued that this tensile force $F_1$ results into a radial force $F_r$, which imparts a bending load on the clamped pins 10 and which is given as $F_R=2F_1 \sin β/2$, so that approximately $F_r \approx p/R \cdot F_1$.

This radial force is during operations in equilibrium with the contact force Q, which is exerted on the longitudinal end surfaces 17 and 19, which have a radius of curvature $R_w$ in radial direction and said force results into a bending of the pin, which is schematically indicated with the dot-dash line 15 in FIG. 1d. This also changes the position of the curved end surfaces 17 and 19 with respect to the pulley surfaces and in a movement of the contact points between the respective end surfaces and the pulley sheaves which contact them.

It is of course of importance that the components of the pin assemblies have an optimal stiffness, but this goes particularly for the first pins, such that this bending, brought about by these radial forces, will be as small as possible. When this bending is important, the links which lie nearest to the ends 17 and 19 of the pins will be loaded by a higher tensile force than the links which lie nearer to the center of these pins, this as a result of the fact that the total circumferential length of the chain will be greater at the end of the pins than in the middle part; this must be accommodated by a greater elastical deformation of the outer links, but this deformation must be limited. Because during the running of the chain over the pulley the force $F_1$ varies from a low value in the slack part of the chain 40 to a high value in the tight part thereof there will be, as indicated above, a relative movement between the end surfaces of the pins and the pulley sheaves which leads to wear of the pin ends. Although this wear will be small, it is sufficient to decrease the surface roughness which is present directly after the fabrication of the pins, so that the ends 17 and 19 tend to become smoother and the original torque transmitting capacity of the chain thought the pulley sheaves decreases.

It is thus clear that both effects must be as small as possible and to this end the bending must be minimal.

FIGS. 2a and 2b show in longitudinal and side view, respectively, a first pin 10; with the running direction of the chain in which this pin is accommodated, indicated with the arrow 22. As FIGS. 2a and 2b show this pin has, in the longitudinal direction as indicated with the dashed line 14 a first dimension b, a second dimension (h) in the direction of dashed lined 16 perpendicular to the line 14 and also perpendicular to the running direction 22, and a third dimension (d) in the direction of the dotted line 18 and cross-wise to the line 14 and the running direction 22.

According to the invention for a given value of the first dimension b, as fixed by the width of the chain, the ratio first dimension (b)/second dimension (h)

is as small as possible, and preferably smaller than 4.1, while furthermore first dimension (b)/third dimension (d)

is also as small as possible, and preferably smaller than 8.2.

Under those circumstances the pin 10, which cooperates with the pulley sheaves obtains an optimal stiffness.

Experiments have shown that, when changing the ratio which is valid for the first pins: first dimension (b)/second dimension (h) from a value of 4.4 to 4.1 and the ratio first: dimension (b)/third dimension (d) from 9 to 8.2 this results into a significant improvement: the life time of the chain increased with a factor 2, while the duration during which the chain appears to be capable to transfer a torque without slip, was at least five times longer.

Figure 3:
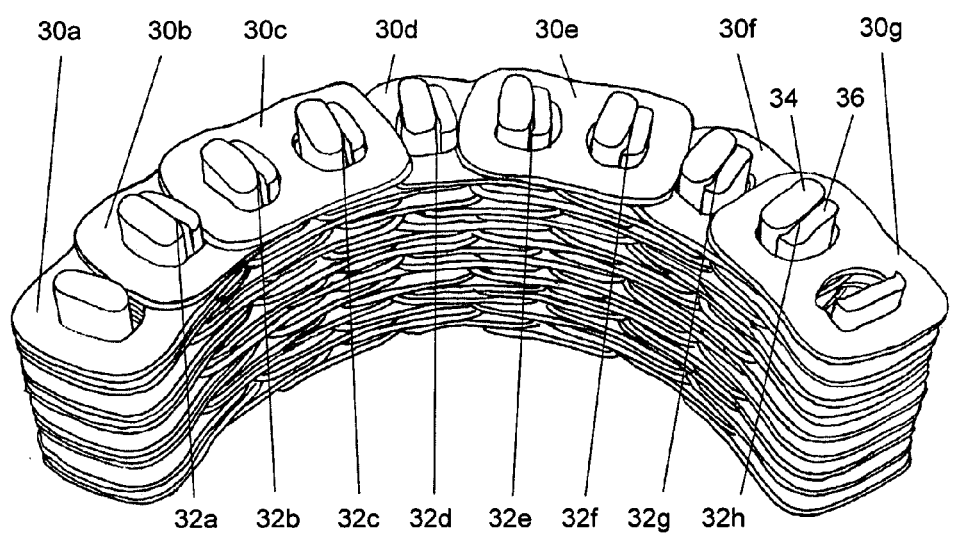
FIG. 3 a perspective view of a part of a transmission chain according to one embodiment of the present application.

FIG. 3 shows a part of a transmission chain with the links 30a-30g and the rocker assemblies 32a-32h, each comprising a first pin 34 and a second pin 36, as indicated for the assembly 32h. Here, too, the indicated dimensions are valid.

FIG. 4 shows schematically the known way in which a transmission chain according to the present application, namely the transmission chain 40, cooperates with the conical surfaces of the pulley sheaves 42a, 42b, 44a, 44b of a continuously variable transmission. The cross-wise displaceable sheaves 42b and 44b are, in a way known in itself, displaceable in axial direction, thus in the direction of the arrows 76 and 78, respectively. As shown, the ends of the pins 46 are clamped between the pulley sheaves 42a, 42b and 44a, 44b. The pulley sheaves 42a, 42b could be the driving pulleys and the chain 40 transfers the torque to the driven pulleys 44a, 44b.

What is claimed:

1. A transmission chain with links mutually coupled by rocker assemblies, which each comprise a first and a second elongated pin, of which the first pin rolls during operation with a curved longitudinal surface over an opposite longitudinal surface of the second pin, while in each rocker assembly the first pin is destined to cooperate in a force transferring way with an opposite cone pulley of a pair of pulley sheaves, and the first pin has a first dimension (b) in the longitudinal direction thereof, a second dimension (h) in a direction perpendicular to the longitudinal direction as well as to the running direction of the chain in which said pin is accommodated and a third dimension (d) cross-wise to the longitudinal direction and in the running direction, wherein for each value of the first dimension (b), as determined by the preferred width of the chain, the second and third dimensions (h) and (d) respectively, are chosen such that the respective ratio between the first dimension (b) and the second dimension (h) is less than or equal to approximately 4.1, and the ratio between the first dimension (b) and the third dimension (d) is less than or equal to approximately 8.2.

* * * * *